June 8, 1971 M. E. BAUM 3,583,884
NOVEL COATING FOR FOAMED POLYSTYRENE
Filed June 30, 1969

INVENTOR.
MELVIN E. BAUM
BY J. E. Armstrong
Attorney

United States Patent Office 3,583,884
Patented June 8, 1971

3,583,884
NOVEL COATING FOR FOAMED POLYSTYRENE
Melvin E. Baum, Monroeville, Pa., assignor to
Koppers Company, Inc.
Continuation-in-part of application Ser. No. 616,897,
Feb. 16, 1967. This application June 30, 1969, Ser.
No. 837,812
Int. Cl. B32b 27/08, 27/36
U.S. Cl. 117—138.8UA                   8 Claims

ABSTRACT OF THE DISCLOSURE

Articles formed of foamed polystyrene are coated by a method which involves forming a layer on said article of (1) an unsaturated polyester resin and (2) an ethylenically unsaturated polymerizable material selected from esters of the formula:

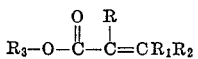

where $R_6$ can be hydrogen or lower alkyl; where $R_1$ can be H or lower alkyl; $R_2$ can be H, lower alkyl, or $COOR_6$, where $R_6$ is hydrogen or lower alkyl and $R_3$ is a hydroxyalkyl group having 2–12 carbon atoms or a polyether group of the formula:

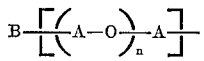

where A can be an alkylene group having 2–3 carbon atoms and $n$ is an integer from 1 to 15, and B is a hydroxy group or a

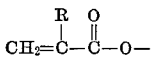

group where R is defined as above; and esters of the formula:

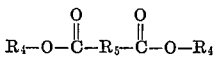

where $R_4$ is an allyl group and $R_5$ is phenylene, ethylenedioxy and dioxydiethylene-ether. The coatings are cured without substantial attack upon the surface of the polystyrene foamed article. The total copolymerizable mixture may be diluted with styrene to the extent of about 5 to 35% by weight of the mixture.

CROSS-REFERENCE TO RELATED APPLICATIONS

This application is a continuation-in-part of copending application Ser. No. 616,897, filed Feb. 16, 1967, and now abandoned.

BACKGROUND OF THE INVENTION

Articles formed from expanded polystyrene have disadvantages in that polystyrene foam is very susceptible to attack by solvents and easily married, scratched, or torn. The technical manual, Dylite Expandable Polystyrene, by Sinclair-Koppers Company, in Chapter 7, Bulletin C–9–273, dated November 1965, entitled "Adhesives and Coatings Used With Foamed Dylite Polystyrene," on page 7, points out that the very attractive, inexpensive polyester coatings should, because of solvent action on foamed polystyrene, not be used except over a multibarrier pre-coat of shellac or other inert primers. Various other coatings for foamed polystyrene are suggested in the bulletin. Any attack on the polystyrene surface of a foamed article manifests itself by craters or roughness on the surface of the article.

SUMMARY OF THE INVENTION

It has now been found that certain copolymerizable mixtures, the major ingredient of which is a polyester resin, can be used for coating foamed polystyrene articles to impart desirable characteristics thereto without significant attack on the surface of the foamed article. These mixtures comprise unsaturated polyesters as their major ingredient and acrylates, crotonates, lower alkyl substituted acrylates, lower alkyl substituted cortonates; maleic or fumaric half esters, lower alkyl substituted maleic or fumaric half esters; maleic or fumaric esters, lower alkyl substituted maleic or fumaric esters; and diallyl esters. If desired, the mixture may be diluted with styrene, an inexpensive monomer. Heretofore, styrene has not been used because of its solvent action on polystyrene foam. In accordance with this invention, the mixture may be diluted with styrene up to 35% by weight of the total copolymerizable mixture. The foamed polystyrene articles have applied thereto a layer of this copolymerizable mixture and the mixture cured.

BRIEF DESCRIPTION OF THE DRAWINGS

A flow diagram which schematically illustrates the process of the invention is shown in FIG. 1. The foamed polystyrene article has applied thereto a coating of a mixture of polyester resin and the acrylates, crotonates, lower alkyl substituted acrylates and crotonates; maleic or fumaric half esters, lower alkyl substituted maleic or fumaric half esters; maleic or fumaric esters, lower alkyl substituted maleic or fumaric esters; or diallyl esters. Styrene and a suitable curing catalyst may be added if desired. The coating is applied to the polystyrene article and cured by various known methods to provide a coated foamed polystyrene article having various desirable characteristics.

A foamed polystyrene container 2 is illustrated in FIG. 2, the container having applied thereto the coating 6 of the present invention. A partial cutaway of the container shows the foamed polystyrene 4, and the coating 6 of the invention on the exterior surface of the container illustrating that no significant craters or irregularities are produced in the foamed polystyrene surface when using the coating method of the present invention.

DETAILED DESCRIPTION

Figure 1:
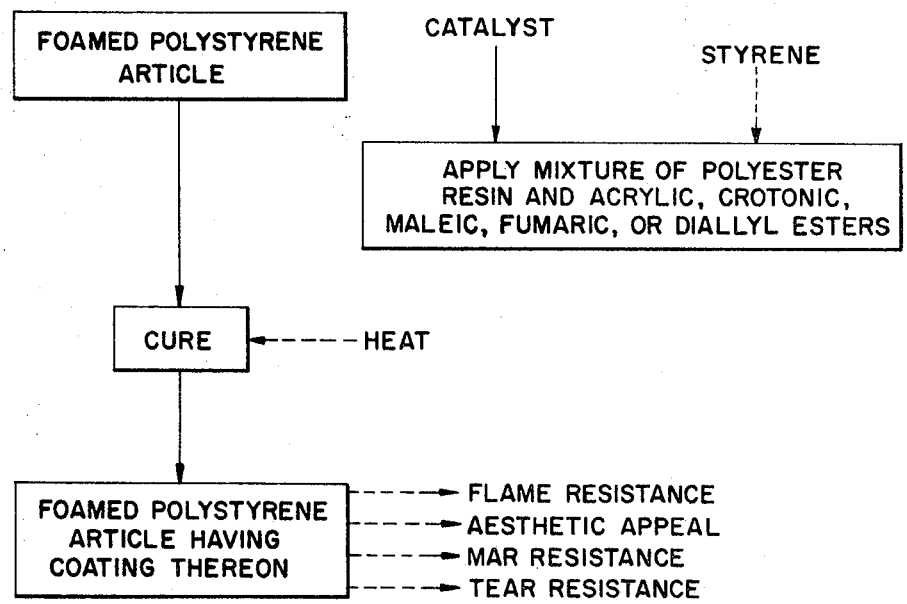
Figure 2:
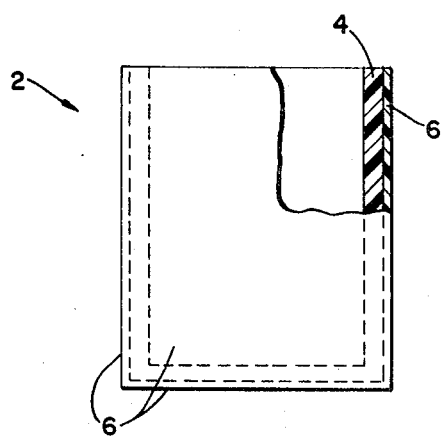

The major proportion of the coating composition is an unsaturated polyester resin and may constitute from 60 to 95% by weight of the total copolymerizable composition. The unsaturated polyester resin to be used in the copolymerizable mixture can be any of the readily available commercial polyesters. Such unsaturated polyesters are well known in the art. The polyesters are generally formed by the esterification reaction of a carboxylic acid or anhydride with polyhydric alcohols, at least one of these reactants having α,β-ethylenic unsaturation. The esterification products produced contain ethylenic unsaturation in the essentially linear chains. This unsaturation is suitable for subsequent reaction. An example of the polyesters suitable in the invention are those sold under the trademark Koplac, provided that the amount of styrene be within the limits herein prescribed.

The specific polyester resin to be used in each instance depends upon the properties which are desired in the coating for the foamed polystyrene article. For example, if flame resistance is desired, halogenated unsaturated polyesters or other polyesters known to resist flame can be used.

The minor proportion of the coating composition is an ethylenically unsaturated polymerizable material selected from acrylic, crotonic, maleic, fumaric, and diallyl esters.

The acrylic, crotonic, maleic, or fumaric esters are of the formula:

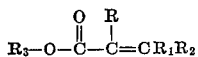

wherein R and $R_1$ can be hydrogen or lower alkyl, $R_2$ can be hydrogen, lower alkyl, or $COOR_6$ where $R_6$ is hydrogen or lower alkyl, and $R_3$ is selected from the hydroxyalkyl group having 2–12 carbon atoms and a polyether group of the formula:

$$B\text{-}(A\text{—}O)_n\text{-}A\text{-}$$

where A is an alkylene group having 2–3 carbon atoms and $n$ is an integer from 1 to 15 and B is hydroxy or a

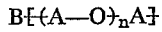

group where R is hydrogen or lower alkyl.

Examples of such esters are, when $R_3$ is a hydroxyalkyl group, hydroxyethyl acrylate, hydroxyethyl methacrylate, hydroxypropyl acrylate, hydroxypropyl methacrylate, hydroxybutyl methacrylate, hydroxyethyl crotonate, hydroxypropyl methylcrotonate, hydroxyethyl α,β-dimethylacrylate, hydroxypropyl α,β-dimethylmethacrylate, hydroxypropyl methylfumarate, hydroxypropyl - methylmaleate, hydroxypropyl methyl dimethylmaleate, hydroxyethyl maleate, hydroxypropyl methyl maleate, hydroxyethyl methyl maleate, hydroxypropyl methyl methyl maleate, hydroxypropyl methylfumarate, hydroxyethyl methyl dimethylmaleate and the like.

Suitable esters of the above formula, where $R_3$ is a polyether group are triethyleneglycol diacrylate and polypropyleneglycol dimethacrylate, triethyleneglycol monoacrylate, triethyleneglycol acrylate fumarate, polypropyleneglycol methacrylate maleate, polypropyleneglycol monomaleate, and triethyleneglycol monomethylmaleate.

The diallyl esters useful in the present invention are those having the formula:

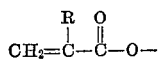

when $R_4$ is an allyl group and $R_5$ can be phenylene, ethylenedioxy or dioxydiethylene-ether. Specific examples of such compounds are diallyl phthalate and diethyleneglycol bis(allylcarbonate).

The copolymerizable mixture preferably contains about 5 to 40 parts by weight of the specific esters herein described for 100 parts of the total copolymerizable mixture, the remainder of the mixture being the unsaturated polyester. Mixtures of the specific esters are also useable in the above-described amounts.

Styrene can be substituted for a portion of the ethylenically unsaturated polymerizable material. Styrene may be substituted to the extent of about 35% by weight of the total weight of the copolymerizable mixture. The density of the polystyrene foam and the condition of the cells is a principal concern in determining how much styrene may be substituted. Higher density polystyrene foam, 3 pounds per cubic feet or greater with closed celled structure, can tolerate 35% by weight styrene based on total weight of the copolymerizable mixture without serious deterioration of the surface of the foam article. Lighter density foam polystyrene material with open celled surface structure attained by, for example, hot wire cutting is much more susceptible to styrene attack and corresponding less amounts of styrene should be used. Also, in place of styrene, a monomer such as vinyltoluene may be used.

The amount of time necessary for copolymerization of the unsaturated polyester resin and the ethylenically unsaturated polymerizable material is, of course, pertinent to commercial practices. Depending upon the mixture, heat curing with infra-red lamp or the like to accelerate a catalyst curing may be suitable.

Catalysts to increase the rate of copolymerization of the unsaturated polyester resin and the ethylenically unsaturated polymerizable material are advantageously used. Such catalysts are used in an amount of about 0.5 to 2.5% by weight of the copolymerizable mixture. Illustrative of the catalysts which may be used are the various organic peroxides and hydroperoxides well known in the art. Examples of the organic peroxides are benzoyl peroxide, substituted benzoyl peroxide, acetyl peroxide, cyclohexanone peroxide, dicumyl peroxide, methyl ethyl ketone peroxide, and the like. These may be used in conjunction with promoters such as tertiary amines, metal esters, and the like. For example, a mixture of methyl ethyl ketone with cobalt naphthenate, octanoate, or linoleate may be used, or to this mixture there may be added a second promoter such as dimethylaniline or diethylaniline. Also, a mixture of benzoyl peroxide and a dialkyl aniline may be used, as may a mixture of cyclohexanone peroxide and manganese naphthenate. In addition, other catalysts such as organic hydroperoxides, for example, cumene hydroperoxide and t-butyl hydroperoxide in conjunction with organic mercaptans or other promoters are useful, as are other polymerization catalysts such as Friedel-Crafts catalysts, for example, aluminum chloride or stannic chloride. Also useful are the boron trifluoride and trialkyl boron catalysts. The amount and specific catalyst to be used for each system is readily ascertained by one skilled in the art.

The copolymerizable mixture can also contain conventional inhibitors, ultraviolet light absorbers, and pigments or dyes. Filler such as ground glass, clays, alumina, calcium carbonate, talc, and silica may also be used. Reinforcement materials such as glass fibers may also be included.

To form the copolymerizable mixtures for use in the present invention, the unsaturated polyester and the desired ester, with styrene added if preferred, are mixed together to form a liquid coating composition. This liquid coating is then applied to the polystyrene article. Before the application, suitable catalysts may be added to the mixture and the mixture then used for coating the article, or some catalyst components can be sprayed on the polystyrene surface before the application of the polyester mixture. Systems are known in the art to bring together the catalyst(s) and resin mixture at the appropriate time. The coating of copolymerizable mixture is applied by any known process, such as by spraying, brushing, dipping, and the like. The amount of copolymerizable mixture applied to the surface by such methods depends on the specific properties desired in the finished article. Thick or thin coats of polyester resin can be added at will by various known convenient methods. Normally, the coatings will vary from 1 to 30 mils in thickness.

Also, the coating composition, described in this invention, may be used as a primer coating for foam polystyrene articles, thereby protecting the surface for subsequently to be applied coatings containing greater amounts of styrene or other foam attacking materials.

My invention is further illustrated by the following examples.

Example I

A copolymerizable mixture was formed by combining 70 parts by weight of a polyester resin, prepared from 1 mole part of maleic anhydride, 1 mole part of phthalic anhydride, and 2.2 mole parts of propylene glycol, and adding to the polyester resin 20 parts by weight of diallyl phthalate, and 10 parts by weight of styrene. The mixture was thoroughly mixed, and the copolymerizable mixture with added catalyst brushed on a polystyrene foam ice bucket. The polystyrene had a density of about 1.5 pounds per cubic foot. A coating having a thickness of about 3 mils of the clear, syrupy copolymerizable mixture was brushed on the foam polystyrene bucket. The coated foamed polystyrene bucket was allowed to stand at room temperature and, after 24 hours had passed, a coating resulted on the polystyrene article which was hard and glossy. This coating was mar and tear resistant.

Example II

A series of compositions were formed in which the polyester resin was kept constant at 70% by weight and the ethylenically unsaturated polymerizable material kept constant at 30% by weight. The ethylenically unsaturated material constituted two components and the ratios of the two components were varied. Thus, the one component, triethyleneglycol dimethacrylate was varied from 0–30% by weight and the other component, styrene, was by difference varied from 30–0% by weight. The polyester was a commercially available resin prepared from a ratio of 1 mole part of maleic anhydride, 1 mole part of phthalic anhydride, and 2.2 mole parts of propylene glycol. Each of the compositions containing various ratios of styrene and triethylene-glycol dimethacrylate were then separated into two portions, one portion having a catalyst added thereto and the other portion without any added catalyst. The catalyzed compositions contained 1.5% by weight of catalyst. The catalyst used was 1% methyl ethyl ketone peroxide (as a 60% solution in dimethylphthalate) and 0.5% cobalt naphthenate (as a 6% cobalt content solution in mineral spirits). Five drops of each individual composition were dropped together on blocks of opened cell (obtained by hot wire cutting) foamed polystyrene having a density of 1 pound per cubic foot. The resins were then observed, the time of attack and the severity of the attack on the surface of the blocks noted. The results obtained are listed in Table I.

Example III

The procedure of Example II was repeated, except that hydroxypropyl methacrylate was substituted for the triethyleneglycol dimethacrylate in the composition. The results obtained are listed in Table II.

TABLE II

| Sample | Percent | | | Catalyst | Severity of attack time, hours | | | | Cavity formed after 48 hours | |
|---|---|---|---|---|---|---|---|---|---|---|
| | Polyester | Styrene | Hydroxypropyl methacrylate | | ½ | 0.5 | 2 | 24 | Depth, inch | Width, inch |
| H | 70 | 30 | 0 | 0 | S | | | | ⅝ | ¼ |
| | | | | 1.5 | S | | | | S | |
| I | 70 | 25 | 5 | 0 | Sl | S | | | ⅛ | 5/16 |
| | | | | 1.5 | S | | | | S | |
| J | 70 | 20 | 10 | 0 | Sl | S | | | ¼ | ¼ |
| | | | | 1.5 | S | | | | S | |
| K | 70 | 15 | 15 | 0 | Sl | Sl | S | | | 3/16 |
| | | | | 1.5 | N | N | N | N | None | |
| L | 70 | 10 | 20 | 0 | N | N | N | N | do | |
| | | | | 1.5 | N | N | N | N | do | |
| M | 70 | 5 | 25 | 0 | N | N | N | N | do | |
| | | | | 1.5 | N | N | N | N | do | |
| N | 70 | 0 | 30 | 0 | N | N | N | N | do | |
| | | | | 1.5 | N | N | N | N | do | |

S=Severe.    Sl=Slight.    N=No noticeable attack.

Example IV

A series of compositions were formed in which the polyester resin was kept constant at 60% by weight and the ethylenically unsaturated polymerizable material kept constant at 40% by weight. The ethylenically unsaturated material constituted two components and the ratios of the two components were varied. Thus, the one component, triethyleneglycol dimethacrylate was varied from 0 to 40% by weight and the other component, styrene was by difference varied from 40–0% by weight. The polyester was a commercially available resin prepared from a ratio of 1 mole part maleic anhydride, 1 mole part phthalic anhydride, and 2.2 mole parts of propylene glycol. Each of the compositions containing various ratios of styrene and triethyleneglycol dimethacrylate were then separated into two portions, one portion having a catalyst added thereto and the other portion without any added catalyst. The catalyzed compositions contained 1.5% by weight of catalyst. The catalyst used was 1% methyl ethyl ketone, peroxide (as a 60% solution in dimethylphthalate) and 0.5% cobalt naphthenate (as a 6% cobalt content solution in mineral spirits). Five drops of each individual composition were dropped together on blocks of closed cell foamed polystyrene having a density of 3 pounds per cubic foot. The resins were then observed, the time of attack and the severity of the attack on the surface of the blocks noted. The results are noted in Table III.

TABLE I

| Sample | Percent | | | Catalyst | Severity of attack time, hours | | | | Cavity formed after 48 hours | |
|---|---|---|---|---|---|---|---|---|---|---|
| | Polyester | Styrene | Triethyleneglycol dimethacrylate | | ½ | 0.5 | 2 | 24 | Depth, inch | Width, inch |
| A | 70 | 30 | 0 | 0 | S | | | | ¼ | ¼ |
| | | | | 1.5 | S | | | | S | |
| B | 70 | 25 | 5 | 0 | S | | | | ¼ | ¼ |
| | | | | 1.5 | S | | | | S | |
| C | 70 | 20 | 10 | 0 | Sl | Sl | S | S | ¼ | ¼ |
| | | | | 1.5 | | Sl | Sl | Sl | Sl | |
| D | 70 | 15 | 15 | 0 | Sl | Sl | S | S | ⅛ | ¼ |
| | | | | 1.5 | N | N | N | N | None | |
| E | 70 | 10 | 20 | 0 | Sl | Sl | Sl | Sl | Sl | |
| | | | | 1.5 | N | N | N | N | None | |
| F | 70 | 5 | 25 | 0 | N | N | N | Sl | do | |
| | | | | 1.5 | N | N | N | N | do | |
| G | 70 | 0 | 30 | 0 | N | N | N | N | do | |
| | | | | 1.5 | N | N | N | N | do | |

S=Severe.    Sl=Slight.    N=No noticeable attack.

TABLE III

| Sample | Polyester | Percent Styrene | Triethylene-glycol dimethacrylate | Catalyst | Severity of attack time, hours 1/2 | 0.5 | 2 | 24 | Cavity formed after 48 hours Depth, inch | Width, inch |
|---|---|---|---|---|---|---|---|---|---|---|
| A | 60 | 40 | 0 | 0 / 1.5 | S / S | | | | 1/4 / 1/4 | 1/4 / 1/4 |
| B | 60 | 35 | 5 | 0 / 1.5 | Sl / Sl | | | | 1/8 / 1/8 | 1/8 / 1/8 |
| C | 60 | 30 | 10 | 0 / 1.5 | Sl / Sl | | | | 1/8 / 1/8 | 1/8 / 1/8 |
| D | 60 | 25 | 15 | 0 / 1.5 | N / N | | Sl / Sl | | Sl / Sl | |
| E | 60 | 20 | 20 | 0 / 1.5 | N / N | | | | None / do | |
| F | 60 | 15 | 25 | 0 / 1.5 | N / N | | | | do / do | |
| G | 60 | 10 | 30 | 0 / 1.5 | N / N | | | | do / do | |
| H | 60 | 5 | 35 | 0 / 1.5 | N / N | | | | do / do | |
| J | 60 | 0 | 40 | 0 / 1.5 | N / N | | | | do / do | |

S=Severe.  Sl=Slight.  N=No noticeable attack.

Example V

To 75 parts by weight of a general purpose polyester resin, such as that sold under the trademark Koplac 2000 (no styrene present) there was added 15 parts by weight of hydroxypropyl methacrylate and 10 parts by weight of styrene. The viscous solution was applied to a foamed polystyrene block (having a density of 1.6 pounds per cubic foot) to a thickness of about 3–4 mils. The mixture was cured at room temperature. After about 24 hours had passed, the foamed polystyrene block had a hard, glossy, smooth coating thereon. The coating was mar resistant. No sign of attack on the foamed polystyrene block was found.

Example VI

The procedure of Example IV was repeated except that hydroxyethyl methacrylate was used in place of hydroxypropyl methacrylate. The results were similar to those of Example IV.

Example VII

The procedure of Example IV was repeated except that hydroxyethyl crotonate was used in place of hydroxypropyl methacrylate. The results were similar to those of Example IV.

Example VIII

The procedure of Example IV was repeated except that hydroxyethyl maleate was used in place of hydroxypropyl methacrylate. The results were similar to those of Example IV.

Example IX

A copolymerizable mixture was made mixing 70 parts by weight of a fire-resistant polyester such as that sold under the trademark Koplac 3400 (no styrene present), 20 parts by weight of propyleneglycol monoacrylate and 10 parts by weight of styrene. The mixture, with catalyst added, was applied to a rod of foamed polystyrene, having a density of about 2.5 pounds per square inch, to a thickness of about 4 mils. After curing at room temperature, the coating caused the foamed polystyrene rod to be flame resistant, whereas an uncoated rod of the same foamed polystyrene was destroyed by an open flame.

Example X

The procedure of Example I was repeated except that diethyleneglycol bis(allylcarbonate) was used in place of diallyl phthalate. The resultant coating had properties similar to those of the coating of Example I.

Example XI

A mixture was formed having 70 parts by weight of a general purpose polyester, such as that used in Example I, and 30 parts styrene. A second mixture was made using methyl methacrylate in place of the styrene. Both mixtures were used to coat foamed polystyrene blocks having a density of about 1.8 pounds per cubic inch. Both mixtures, even with catalyst added thereto to accelerate curing, caused severe surface attack of the foamed polystyrene blocks, causing deep craters therein.

The present invention thus provides a method and a composition for use in coating polystyrene articles. Foamed polystyrene is an important and extensively used material. The foamed polystyrene may have densities ranging from 0.8 to 20 pounds per cubic foot. The foamed polystyrene is made up of individual expandable beads, which, upon molding, fuse to form a lightweight expanded polystyrene article. Since the foamed polystyrene consists of individual cells, each cell having thin walls, any attack upon the foam polystyrene articles causes extensive damage to the surface of the article. In accordance with this invention, foamed polystyrene articles having sharply defined surfaces can be coated with a composition containing a major portion of a polyester resin without affecting the sharply defined details of the article. Coatings may be provided which are glossy, and have aesthetic appeal, or the article can be rendered flame resistant, mar resistant, or chemical or solvent resistant.

What is claimed is:

1. A polyester coated foamed polystyrene article, the foamed polystyrene having a density of about 0.8 pound per cubic foot and having a coating of polyester resin of 1 to 30 mils thickness directly adhered to a substantially regular underlying foam surface composed of fused substantially intact thin-walled cells, said polyester coating consisting essentially of a copolymerized mixture of:
   (a) 60–95% by weight of said mixture of an ethylenically unsaturated polyester resin; and
   (b) 5–40% by weight of said mixture of an unsaturated polymerizable material selected from the group consisting of
      (i) esters having the following formula:

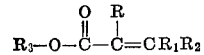

wherein R and $R_1$ are selected from the group consisting of hydrogen and lower alkyl; $R_2$ is selected from the group consisting of hydrogen, lower alkyl, or $COOR_6$ wherein $R_6$ is hydrogen or lower alkyl; $R_3$ is selected from the group consisting of a hydroxyalkyl group having from 2–12 carbon atoms and

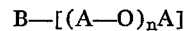

wherein A is an alkylene group having 2–3 carbon atoms, $n$ is an integer from 1–15 and B is selected from the group consisting of a hydroxy group and a

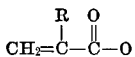

group wherein R is as described above; and (ii) esters having the following formula:

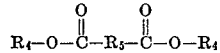

wherein $R_4$ is an ally group and $R_3$ is selected from the group consisting of phenylene, ethylenedioxy and dioxydiethylene-ether.

2. A polyester coated foamed polystyrene article, the foamed polystyrene having a density of about 0.8 to 20 pounds per cubic foot and having a coating of polyester resin of about 1 to 30 mils thickness directly adhered to a substantially regular underlying foam surface composed of fused substantially intact thin-walled cells, said polyester coating consisting essentially of a copolymerized mixture of:

(a) 60–95% by weight of an ethylenically unsaturated polyester resin;
(b) 5–40% by weight of an unsaturated polymerizable material selected from the group consisting of
  (i) esters having the following formula:

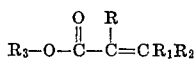

wherein R and $R_1$ are selected from the group consisting of hydrogen and lower alkyl, $R_2$ is selected from the group consisting of hydrogen, lower alkyl, or $COOR_6$ wherein $R_6$ is hydrogen or lower alkyl and $R_3$ is selected from the group consisting of a hydroxyalkyl group having from 2–12 carbon atoms; and
  (ii) esters having the following formula:

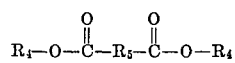

wherein $R_4$ is an allyl group and $R_5$ is selected from the group consisting of phenylene, ethylenedioxy and dioxydiethylene-ether;

(c) 0–35% by weight of styrene; and
(d) 0–2.5% by weight of a curing catalyst.

3. The foam polystyrene article of claim 2 wherein said ester is diallyl phthalate.

4. The foam polystyrene article of claim 2 wherein said ester is hydroxypropyl methacrylate.

5. The foam polystyrene article of claim 2 wherein said ester is diethyleneglycol bis(allylcarbonate).

6. The foam polystyrene article of claim 2 wherein said ester is hydroxyethyl crotonate.

7. The foam polystyrene article of claim 2 wherein said ester is hydroxyethyl methylmaleate.

8. The foam polystyrene article of claim 2 wherein vinyltoluene is substituted for said styrene.

References Cited

UNITED STATES PATENTS

| | | | |
|---|---|---|---|
| 2,255,313 | 9/1941 | Ellis | 260—872 |
| 3,026,286 | 3/1962 | Parker | 260—872 |
| 3,166,434 | 1/1965 | Gauger | 260—872 |
| 3,207,645 | 9/1965 | Collardeau et al. | 117—138.8U |
| 3,252,941 | 5/1966 | Mayer et al. | 260—872 |
| 3,264,372 | 8/1966 | Deichert et al. | 260—872 |
| 3,334,155 | 8/1967 | Hopff et al. | 260—861 |
| 3,369,927 | 2/1968 | Voris | 117—138.8U |
| 3,431,319 | 3/1969 | Baum | 117—138.8U |

FOREIGN PATENTS

| | | | |
|---|---|---|---|
| 907,564 | 10/1962 | Great Britain | 260—872 |

WILLIAM D. MARTIN, Primary Examiner

J. E. MILLER, Jr., Assistant Examiner

U.S. Cl. X.R.

117—161K; 260—861, 872